United States Patent [19]
DeMarco

[11] 4,111,670
[45] Sep. 5, 1978

[54] TRUCK MOUNTED SEPARATOR APPARATUS

[75] Inventor: Thomas M. DeMarco, Chicago, Ill.

[73] Assignee: NFE International, Ltd., Palatine, Ill.

[21] Appl. No.: 778,071

[22] Filed: Mar. 16, 1977

[51] Int. Cl.² .............................................. B01D 50/00
[52] U.S. Cl. ....................... 55/315; 55/337;
    55/356; 55/433; 55/385 B; 15/340; 15/352
[58] Field of Search ................. 55/315, 334, 337, 356,
    55/428, 432, 433, 465, 430, 385 B; 15/340, 349,
    352, 353

[56] References Cited
U.S. PATENT DOCUMENTS

| | | | |
|---|---|---|---|
| 3,541,631 | 11/1970 | Kluge et al. | 55/432 |
| 3,780,502 | 12/1973 | Dupre et al. | 55/334 |
| 3,870,489 | 3/1975 | Shaddock | 55/356 |
| 3,955,236 | 3/1976 | Mekelburg | 55/337 |

FOREIGN PATENT DOCUMENTS 217,948  6/1909  Fed. Rep. of Germany ............. 55/465

*Primary Examiner*—Frank W. Lutter
*Assistant Examiner*—David L. Lacey
*Attorney, Agent, or Firm*—Merriam, Marshall & Bicknell

[57] ABSTRACT

Truck mounted vacuum collector apparatus including first and second particle collection chambers having adjacent discharge openings for simultaneously emptying both chambers at a single discharge point. The second chamber is mounted on a platform forward of the first chamber. A passageway extends from the second chamber below the first chamber to a discharge opening immediately below a discharge opening in the first chamber. A hinged door covers both discharge openings. The chambers are emptied by hydraulically tilting the platform and allowing the door to swing open to permit the accumulated matter to empty from the first chamber through the corresponding discharge opening and from the second chamber through the second discharge opening via the passageway below the first chamber.

16 Claims, 5 Drawing Figures

TRUCK MOUNTED SEPARATOR APPARATUS

BACKGROUND OF THE INVENTION

This invention relates generally to truck mounted collector apparatus and more particularly to a multi-stage truck mounted vacuum collector apparatus having several particulate material collection chambers adapted to selectively discharge collected particulate materials from a common discharge point.

Portable, heavy-duty vacuum collector apparatus are commonly used in industrial and other applications to collect wet and/or dry particulate materials. In industrial applications such as at foundries and manufacturing plants, in particular, the apparatus may be used to collect waste materials and spillage such as slag, steel shot, sand, ash, carbon black and the like. As a matter of economy, a vacuum collector apparatus may be used to collect various materials varying widely in particulate size and weight and, in some cases, even water. For example, operations at foundries normally result in the accumulation of wet and dry sand, often admixed with metal chips from casting and metal shop spillage from cast cleaning. Efficient foundry operation requires removal of those materials. Manufacturing plants also use conveyors, grinders, pneumatic chisels, wire brushes, machine tools, and other power tools and machines producing dust and other particulate materials. Such use gives rise to serious health, safety, and machine maintenance problems which can only be eliminated through continuous removal of such materials.

Because of the diversity of the materials collected, such vacuum collector apparatus preferably comprises a self-contained multi-stage unit wherein each one of the several stages is utilized to remove particulate materials or spillage in a particular size and weight range. The three-stage apparatus in U.S. Pat. No. 3,780,502, issued to Dupre et al., has been found to be quite effective in such applications. In that apparatus, heavier particulate materials suspended in the intake airstream are removed from the airstream in a cyclone separator stage according to well known physical principles of heterogeneous material flow. Subsequently, the airstream, still carrying lighter particles, is drawn through a vertical downwardly extending linear accelerator nozzle to remove the heaviest of the remaining materials therefrom. Finally, the airstream is directed through a plurality of fabric, flat bag, filter elements which filter out and remove substantially all of the remaining particulate material in the airstream and, in particular, dust.

Often, the spillage materials to be collected by the apparatus are found at different locations in the plant and are not easily reached by a stationary vacuum apparatus. Mobile vacuum apparatus have been provided heretofore in the form of self-propelled mobile units. Such units have commonly included a first box in which heavier refuse is collected and a dust container for collecting dust and lighter weight waste materials. These materials are commonly emptied from the box and the dust containers through respective individual doors provided therein. Thus, with some units, if the materials are to be emptied at a single discharge point, the unit must be repositioned at the discharge point as first the box and then the dust container are unloaded.

Another prior art apparatus comprises a self-contained suction type cleaning unit having a rearward hopper for collecting heavier dirt particles and refuse and an adjacent forward dust bin in which dust and lighter particles are deposited. The hopper and the dust bin are separated during normal vacuum operation by a swinging door covering an opening in the wall between the hopper and the dust bin. The collected waste materials are emptied from the hopper and the dust bin by tilting a frame supporting the hopper and the dust bin to discharge the collected particulate matter through the rear tailgate. The swinging door covering the opening between the two chambers allows the materials collected in the dust bin to empty through the hopper. When the particulate waste material collected in the hopper contains some moisture, however, the apparatus may be clogged. That is, the heavier particulate matter may cake in the hopper and prevent the swinging door from opening during discharge. As a result, unless the operator cleans the hopper by removing the caked particulate matter to free the swinging door, the dust may be trapped in the dust bin and ultimately impair the operation and effectiveness of the vacuum collector apparatus.

SUMMARY OF THE INVENTION

The truck mounted vacuum collector apparatus of the present invention includes a pair of collection chambers mounted on a platform pivotably coupled to the frame of a truck. The first chamber is mounted on the platform rearwardly of the second chamber and above a passageway extending from the second chamber to the rear of the platform. A vacuum collector apparatus comprising a multi-stage separator is positioned above the open top end of the second chamber and an air duct couples a particle laden airstream from the first chamber to the multi-stage separator. In one embodiment, the airstream is coupled directly to the multi-stage separator while in another embodiment, the duct couples the airstream to the second collection chamber where it is drawn into the separator. The first chamber includes a discharge opening in its rear wall and the passageway from the second chamber extending below the first chamber ends in a discharge opening immediately adjacent to and below the discharge opening of the first chamber. A hinged door covers the discharge openings during normal collection operations. Hydraulic apparatus is provided to lift the front end of the platform to tilt the apparatus so that the collected materials slide from the first and second chambers and out the respective first and second discharge openings as the door swings away therefrom.

Accordingly, the collection chamber apparatus of the present invention facilitates the emptying of both collection chambers simultaneously at a single discharge point. Moreover, the second chamber is not susceptable to blockage as a result of material caking in the first chamber. That is, even if the particulate matter in one chamber is moist and cakes, the particulate matter is free to flow from the other chamber. Thus, the collection chambers need not be cleaned each time after the collection of moist particulate matter to insure proper operation of the apparatus.

BRIEF DESCRIPTION OF THE DRAWINGS

The features of this invention which are believed to be novel are set forth with particularity in the appended claims. The invention, together with its further objects and advantages thereof, may be best understood, however, by reference to the following description taken in conjunction with the accompanying drawings, in which like reference numerals identify like elements in the several figures and in which:

DETAILED DESCRIPTION

Figure 1:
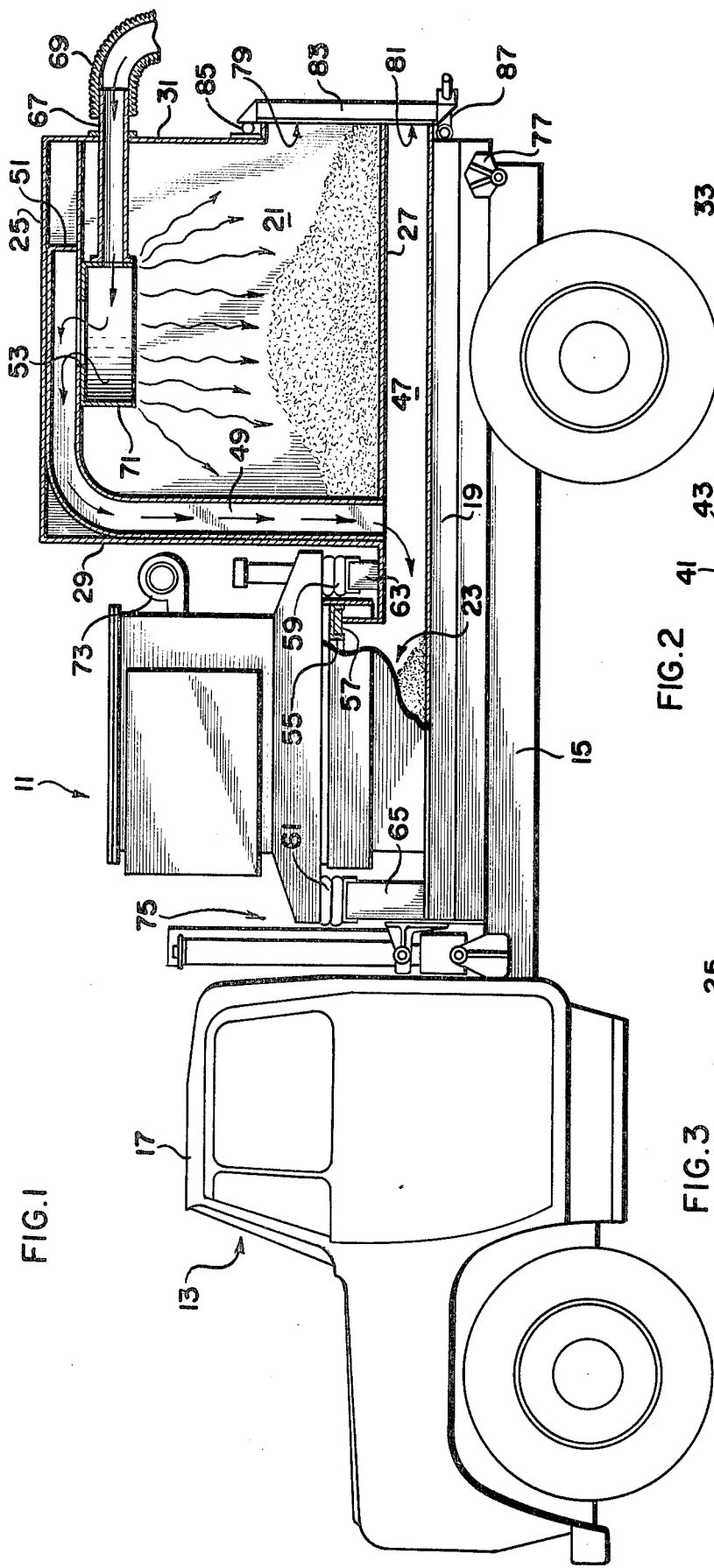
FIG. 1 is a side elevational view partially in section illustrating a first embodiment of the truck mounted vacuum collector apparatus of the present invention.

Referring now to FIG. 1, a vacuum collector apparatus 11 is mounted on a truck, identified generally at 13, which is used to transport the apparatus to various locations at which spillage or waste materials are to be collected and to then transport the collected materials to a discharge area or dump.

The vacuum collector apparatus 11 preferably comprises a unitary multi-stage waste particle separator for separating particles of differing sizes and weights from the airstream drawn through the apparatus. One such vacuum collector apparatus is the multi-stage separator apparatus described in U.S. Pat. No. 3,780,502. It will be understood, however, that other separator apparatus may be found to provide adequate particle operation and thus may be adapted to this application.

The truck 13 includes generally a chassis comprising a bed or frame 15 extending rearwardly of the truck cab 17 to support thereon a platform 19 on which are mounted the vacuum collector apparatus 11 and a pair of associated particle collection chambers, identified generally at 21 and 23, for collecting and holding the particulate materials removed by the vacuum collector apparatus.

Figure 2:
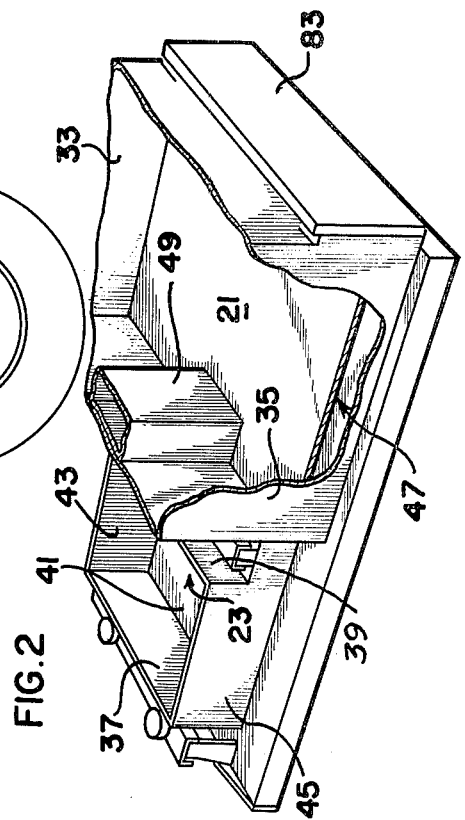
FIG. 2 is a partial perspective view with sections cut away to further show the first collection chamber and the second waste collection chamber.

As shown in FIG. 1 and further illustrated in FIG. 2, the first collection chamber 21 is a reinforced steel enclosure, having a top wall 25, a floor 27, a front wall 29, a rear wall 31, and side walls 33 and 35. Although in the present embodiment, a box-like chamber is shown, it will be understood that other chamber configurations, e.g., cylindrical, can be utilized without departing from the principles of the present invention. The second collection chamber 23, also constructed of reinforced steel, is located forward of the first chamber 21 and comprises a front wall 37, a partial back wall 39, a bottom wall 41, and a pair of side walls 43 and 45. The chamber 23 is open at the top. The bottom wall 41 of the second collection chamber 23 extends below the floor 27 of the first chamber 21 to the rear edge of the platform 19 while the floor 27 extends forwardly to the bottom edge of the rear wall 39 of the second chamber 23. The floor 27, the bottom wall 41, and side walls 33, 35 define a passageway, identified generally at 47, below the first collection chamber 21, leading from the second chamber 23 to the rear of the platform 19. Also, the bottom portions of the side walls 43 and 45 extend rearwardly to the front wall 29 of the first chamber 21 to enclose the portion of the passageway extending between the two chambers.

In the present embodiment an air duct 49 couples the second collection chamber 23 to the first chamber 21. The duct 49 extends along the interior surfaces of the top and front walls, 25 and 29, respectively, from the rear wall 31 where it is blocked by a wall 51 to the front of the floor 27 where it opens to the passageway 47 to the second chamber 23, the duct 49 opening to the first chamber 21 through an opening 53 in the interior surface of the duct near the center of the top wall 25.

The vacuum collector apparatus 11 includes a platform base structure of a size accommodating mounting in air-tight relation upon the second collection chamber 23 in communication with the open top end thereof. In particular, the base structure comprises a channel member 55 running adjacent the periphery of the bottom of the collector apparatus. A gasket 57 is provided in the channel 55 to engage the top edge of the front, rear and side walls 37, 39, 43, 45 of the second chamber when the vacuum collector apparatus is set thereon. The gasket 57 seals the vacuum collector apparatus 11 in air-tight relation to the second chamber 23. Collapsible pneumatic bellows 59 and 61 extend upwardly from support members 63 and 65, respectively, to support the vacuum collector apparatus 11 on the second collection chamber 23.

In operation, the vacuum collector apparatus 11 produces a vacuum therein which is translated to the second collection chamber 23 and through the passageway 47 and the duct 49 to the first chamber 21. An air inlet tube 67 extends through the rear wall 31 of the first collection chamber 21 to communicate with a flexible hose 69 connected to the outer end of the inlet tube 67. The vacuum created in the apparatus is effective to draw particulate materials and/or liquids such as water into the apparatus through the hose 69 as an operator moves the free end of the hose 69 into proximity therewith. Of course, depending on the vacuum apparatus 11 and other variables such as the cross-sectional size and the length of the hose 69, the apparatus can be used to collect heavier materials such as rock, cast iron chips, and the like.

Figure 3:
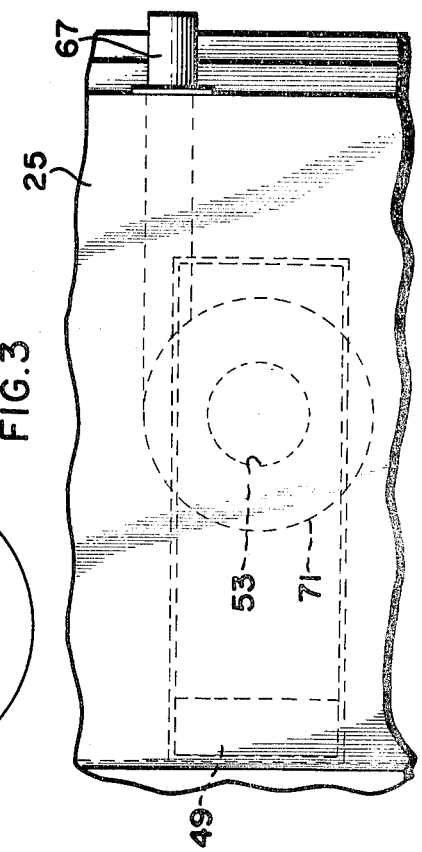
FIG. 3 is a partial top plan view showing centrifugal separator apparatus provided in the first collection chamber in relation to the duct connecting the first chamber with the second chamber.

As the materials are drawn into the apparatus, they are directed through the inlet tube 67 to a centrifugal separator 71 mounted to the interior surface of the duct 49 at the opening 53 thereto as illustrated further in FIG. 3. The centrifugal separator 71 directs the airstream into a circular pattern, and the heavier particles and the liquids, if any, drop from the airstream through the open bottom end of the separator 71 as the airstream, carrying the remaining lighter particles, passes through the opening 53 into the duct 49. The duct 49 directs the airstream and the remaining materials to the passageway 47 between the first and second collection chambers 21 and 23 where the airstream is drawn into the second chamber 23. There, some of the remaining particles in the airstream may settle to the bottom of the chamber as the partially cleaned airstream is drawn into the multi-stage separator apparatus 11 which removes the smaller particles before selectively depositing them also into the second chamber 23. The cleaned air then exits from the apparatus through a blower exhaust muffler 73.

Figure 4:
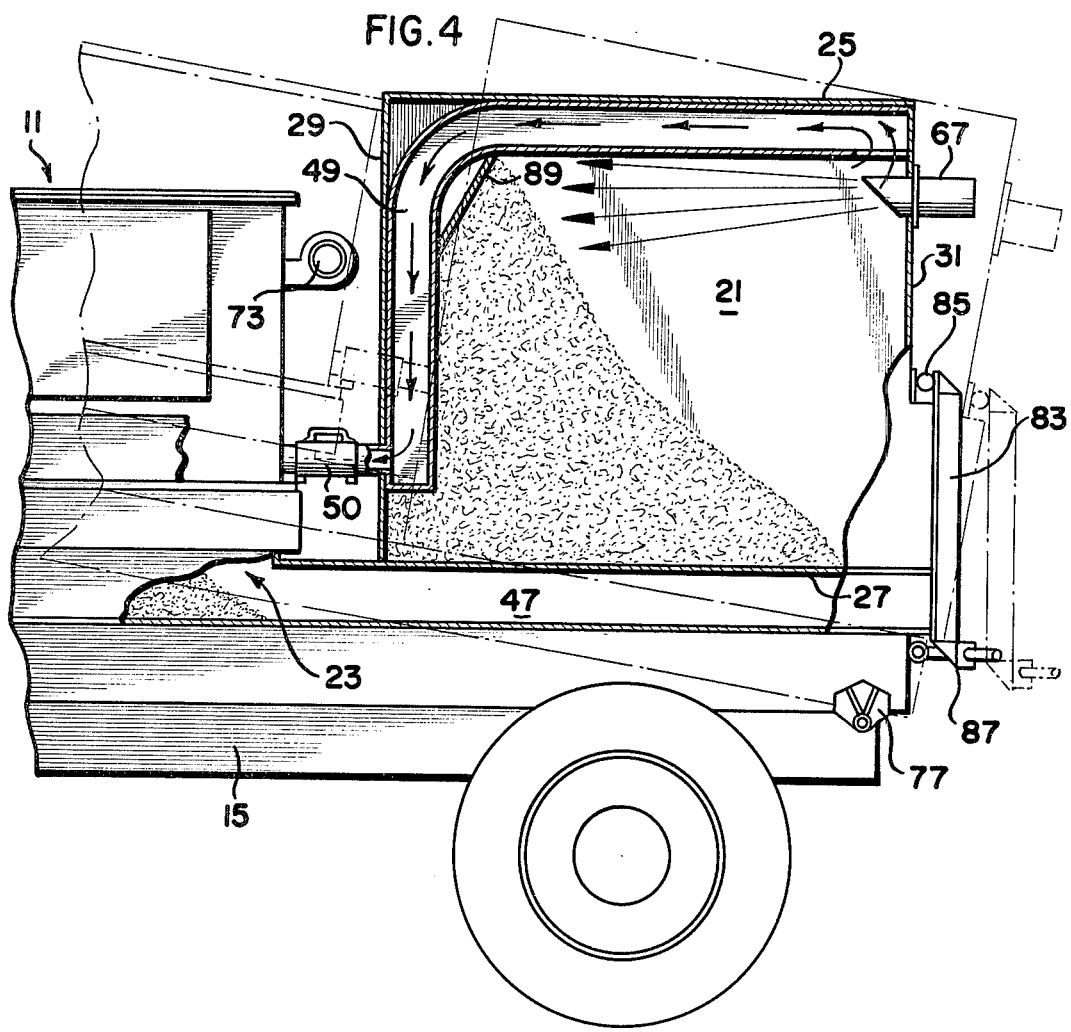
FIG. 4 is a side elevational view partially in section illustrating another embodiment of the present invention.
Figure 5:
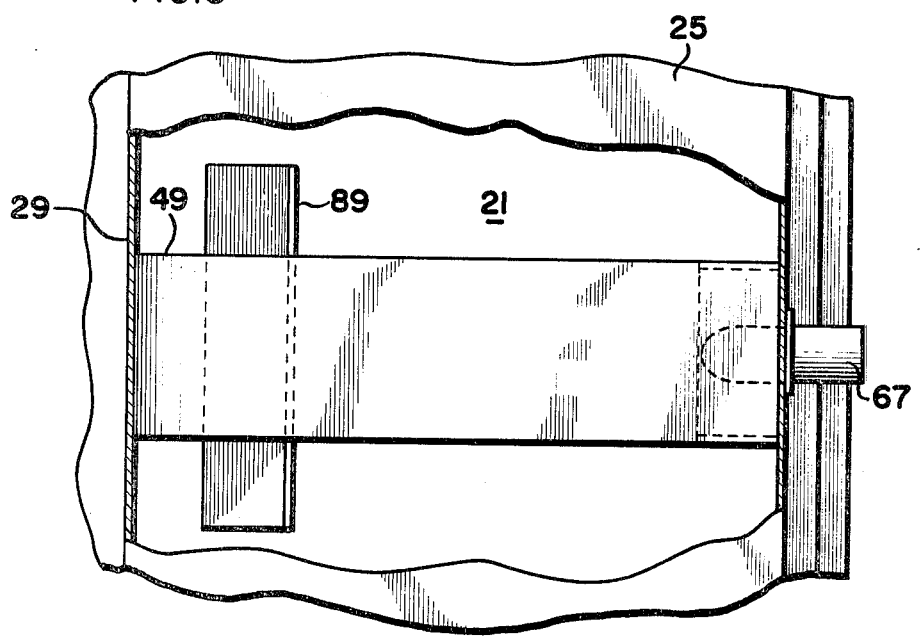
FIG. 5 is a partial top plan view of the top of the first collection chamber in the embodiment shown in FIG. 4.

In a second embodiment shown in FIGS. 4 and 5, however, the duct 49 does not communicate directly with the second chamber 23, but rather ends at a point in the front wall 29 above the floor 27 of the first chamber where a coupling member 50 couples the incoming airstream directly from the duct 49 into, for example, the cyclone separator stage of the multi-stage separator apparatus 11. There is no direct communication between the first and second chambers 21 and 23. As in the previous embodiment, the multi-stage vacuum collector apparatus 11 is mounted above the second chamber 23 and deposits the lighter weight particulate matter in the second chamber. By coupling the airstream directly into the multi-stage collector apparatus, however, any possible interaction between the airstream and the accumulated materials previously collected in the second chamber 23 is prevented, eliminating any possibility that the airstream can aggitate the material stored in the second collection chamber 23 and cause it to rejoin the airstream.

After the collection chambers are full, or whenever it is desirable to empty the chambers, the truck mounted apparatus can be driven to a dump or discharge area for unloading. Hydraulic apparatus, identified generally at 75, is provided to raise the front end of the platform 19 which is pivotably coupled at its other end to the truck frame 15 by a coupling mechanism 77. A discharge opening 79 for the first chamber 21 extends across the bottom portion of the rear wall 31 of the chamber, while the rear end of the passageway 47 extending below the first chamber 21 is open to provide a discharge opening 81 for the second collection chamber 23 which is below and immediately adjacent to the discharge opening 79. The discharge openings 79 and 81 are normally closed during operation of the vacuum collection apparatus by a discharge door 83. The door 83, which covers both openings, 79 and 81, is mounted on the rear wall 31 of the first chamber immediately above the discharge opening 79 by a hinging mechanism 85. A latch mechanism 87 allows the door 83 to be locked in its normally closed position. Thus, in accordance with the principles of the present invention, both chambers are simultaneously emptied at a common discharge point in a single operation by raising the front end of the platform 19 to tilt the apparatus.

As illustrated in FIG. 4, during unloading, the rear door 83 is unlatched and allowed to swing open so that the particulate material collected in the first chamber 21 slides from the chamber through the discharge opening 79 in its rear wall as the platform 19 is tilted. Simultaneously, the material collected in the second chamber 23 slides along the passageway 47 and exits through discharge opening 81. Thus, materials from both chambers are simultaneously discharged from the apparatus at a single point. If, however, the particulate matter collected in the first chamber 21 is moist and cakes, the material in the second chamber 23 is not prevented thereby from being removed or emptied from the apparatus.

Finally, as illustrated in the embodiment shown in FIGS. 4 and 5, the centrifugal separator can be eliminated and replaced by a baffle plate 89 mounted at the front of the chamber 21. In particular, the inlet tube 67 ends at a point near the rear wall 31 of the first collection chamber 21, and the opening 53 in the duct 49 is located adjacent the rear chamber wall 31. The baffle plate 89 is mounted to the duct 49 to shield it from the particle-laden incoming airstream directed toward the baffle 89 at high velocity. Initially, the baffle 89 protects the duct 49 from the severe effects of the particulate materials striking it at high speed, but as the materials are collected in the chamber 21, the materials accumulate near the front wall. These accumulated materials ultimately rise to a level where they absorb the impact of the incoming particles.

Accordingly, there has been shown truck mounted vacuum collector apparatus having improved collection chamber apparatus for discharging collected particulate materials at a single discharge point. The apparatus of the present invention eliminates any problems due to moist particulate matter caking in the first collection chamber.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

I claim:

1. Mobile apparatus for separating materials including heavy particulate matter from an input airstream and for collecting said materials for delivery to a discharge point, said apparatus comprising:

a vehicle having a frame;

a platform supportably positioned on said vehicle frame and having one end pivotably coupled to said frame;

a first enclosed collection chamber mounted on said platform, said first chamber having an inlet through which said input airstream enters said first chamber and a first discharge opening adjacent the pivoted end of said platform;

a second collection chamber mounted on said platform forwardly on said first collection chamber;

vacuum collector means communicating with said second collection chamber in substantial airtight relation therewith;

means including a duct coupling said first collection chamber directly to said vacuum collector means;

said vacuum collector means including means for creating a vacuum to draw said input airstream into said first chamber and through said duct to said vacuum collector means;

means in said first collection chamber for separating said materials comprising generally said heavy particulate matter from said airstream, said heavy particulate matter being collected in said first collection chamber and the remainder of said materials being carried by said airstream through said duct to said vacuum collector means;

said vacuum collector means separating the remainder of said materials from said airstream and emptying said separated materials into said second collection chamber;

means comprising a passageway communicating with and extending rearwardly from said second collection chamber beneath said first collection chamber, said passageway having a corresponding second discharge opening immediately adjacent to said first discharge opening of said first collection chamber at said pivoted end of said platform;

a movable door;

means mounting said door on said first collection chamber to cover said first and second discharge openings; and means for tilting said platform to move said door away from said first and second discharge openings to permit said materials collected in said first collection chamber to empty therefrom through said first discharge opening and said materials collected in said second collection chamber to move through said passageway and empty therefrom through said second discharge opening.

2. Apparatus as claimed in claim 1 wherein said vehicle comprises a truck.

3. Apparatus as claimed in claim 1 wherein said first collection chamber has a rear wall, wherein said first discharge opening comprises an opening through said rear wall across the bottom portion of said rear wall and wherein said second discharge opening is directly below said first discharge opening, wherein said door mounting means includes hinge means for coupling said movable door to said rear wall of said first collection chamber and including latch means for securing said movable door in the closed position wherein said door covers said discharge openings.

4. Apparatus as claimed in claim 1 wherein said separating means in said first collection chamber comprises a centrifugal separator having an input port coupled to said inlet to said first collection chamber for receiving said input airstream, a first outlet port opening into said first collection chamber, and a second outlet port coupled to said duct, said separated materials falling through said first centrifugal separator outlet port into said first collection chamber and said airstream along with the remainder of said materials passing through said second centrifugal separator outlet port into said duct.

5. Apparatus as claimed in claim 1 wherein said first collection chamber comprises a substantially airtight enclosure having generally identifiable front, rear, top and oppositely disposed side walls and a floor, said duct traversing the interior of said first collection chamber along said top wall and said front wall and having an input port in the vicinity of said top wall and an output port opening through said front wall, and said coupling means including a coupling member connecting said duct output port to said vacuum collector means, said airstream along with the remainder of said materials passing from said first collection chamber into said duct through said input port, said airstream and said remaining materials passing through said duct and said coupling member directly into said vacuum collector apparatus.

6. Apparatus as claimed in claim 5 wherein said separating means in said first collection chamber comprises a tubular member extending through said airstream inlet in said rear wall of said first collection chamber and a baffle mounted adjacent the juncture of said top wall and said front wall, said baffle being positioned to intercept said input airstream including said heavy particulate matter directed through said tubular member and shield said duct from bombardment by said heavy particulate matter, said heavy particulate matter being deposited in said first collection chamber.

7. Apparatus as claimed in claim 1 wherein said vacuum collector means comprises a multi-stage particle separator.

8. Apparatus as claimed in claim 1 wherein said second collection chamber has an open top end and including means for removably mounting said vacuum collector means on said open top end of said second collection chamber in substantial airtight relation therewith.

9. Apparatus as claimed in claim 1 wherein said platform tilting means comprises hydraulic apparatus.

10. Mobile apparatus for separating materials including heavy particulate matter from an input airstream and for collecting said materials for delivery to a discharge point, said apparatus comprising:

a vehicle having a frame,
a platform supportably positioned on said vehicle frame and having one end pivotably coupled to said frame;
a first enclosed collection chamber mounted on said platform, said first chamber having an inlet through which said input airstream enters said first chamber and a first discharge opening adjacent the pivoted end of said platform;
a second collection chamber mounted on said platform forwardly of said first collection chamber;
a passageway communicating with and extending rearwardly from said second collection chamber beneath said first collection chamber, said passageway having a corresponding second discharge opening immediately adjacent to said first discharge opening of said first collection chamber at said pivoted end of said platform;
vacuum collector means communicating with said second collection chamber in substantial airtight relation therewith;
a duct coupling said first collection chamber to said passageway;
said vacuum collector means including means for creating a vacuum to draw said input airsteam into said first chamber and through said duct, said passageway and said second chamber to said vacuum collector means;
means in said first collection chamber for separating said material comprising generally said heavy particulate matter from said airstream, said heavy particulate matter being collected in said first collection chamber and the remainder of said materials being carried by said airstream to said vacuum collector means;
said vacuum collector means separating the remainder of said materials from said airstream and emptying said separated materials into said second collection chamber;
a movable door;
means mounting said door on said first collection chamber to cover said first and second discharge openings; and
means for tilting said platform to move said door away from said first and second discharge openings to permit said materials collected in said first collection chamber to empty therefrom through said first discharge opening and said materials collected in said second collection chamber to move through said passageway and empty therefrom through said second discharge opening.

11. Apparatus as claimed in claim 10 wherein said vehicle comprises a truck.

12. Apparatus as claimed in claim 10 wherein said first collection chamber has a rear wall, wherein said first discharge opening comprises an opening through said rear wall across the bottom portion of said rear wall and wherein said second discharge opening is directly below said first discharge opening, wherein said door mounting means includes hinge means for coupling said movable door to said rear wall of said first collection chamber and including latch means for securing said movable door in the closed position wherein said door covers said discharge openings.

13. Apparatus as claimed in claim 10 wherein said separating means in said first collection chamber comprises a centrifugal separator having an input port coupled to said inlet to said first collection chamber for receiving said input airstream, a first outlet port opening into said first collection chamber, and a second outlet port coupled to said duct, said separated materials falling through said first centrifugal separator outlet port into said first collection chamber and said airstream along with the remainder of said materials passing through said second centrifugal separator outlet port into said duct.

14. Apparatus as claimed in claim 10 wherein said vacuum collector means comprises a multi-stage particle separator.

15. Apparatus as claimed in claim 10 wherein said second collection chamber has an open top end and including means for removably mounting said vacuum collector means on said open top end of said second collection chamber in substantial airtight relation therewith.

16. Apparatus as claimed in claim 10 wherein said platform tilting means comprises hydraulic apparatus.

* * * * *